United States Patent [19]

Shuman

[11] 4,441,175

[45] Apr. 3, 1984

[54] PARTIAL BEAM FOCUS SENSING IN AN OPTICAL RECORDING SYSTEM

[75] Inventor: Curtis A. Shuman, Colorado Springs, Colo.

[73] Assignee: Magnetic Peripherals Inc., Minneapolis, Minn.

[21] Appl. No.: 342,459

[22] Filed: Jan. 25, 1982

[51] Int. Cl.³ .......................... H04N 5/76; G11B 7/00
[52] U.S. Cl. ..................................................... 369/45
[58] Field of Search ............................. 369/44, 45, 46; 250/201, 204

[56] References Cited

U.S. PATENT DOCUMENTS

| | | | |
|---|---|---|---|
| 3,969,576 | 7/1976 | Boonstra et al. | 178/6.6 R |
| 3,974,327 | 8/1976 | Van Dijhk | 178/6.6 R |
| 4,123,652 | 10/1978 | Bouwhuis | 250/204 |
| 4,143,402 | 3/1979 | Bricot et al. | 358/128 |

FOREIGN PATENT DOCUMENTS

| | | | |
|---|---|---|---|
| 53-28404 | 3/1978 | Japan | 369/45 |
| 54-116904 | 9/1979 | Japan | 369/45 |

Primary Examiner—Robert L. Richardson

Attorney, Agent, or Firm—William J. McGinnis; Joseph A. Genovese

[57] ABSTRACT

Focus sensing using a light detector array is accomplished in an optical recording system using the light beam returned from the recording media through the objective focusing lens by passing the beam through a spherical focusing lens using a mask such as a knife edge which only passes a portion of the beam to the light detector array. The light detector array is matched to the mask and detects the different partial image patterns formed as a result of the close to focus condition with the recording media too far away from the objective lens and the near to focus condition with the media too close to the objective lens. In the focused condition, the light detector array receives a comparatively fine focused spot of light. Alternative embodiments of the present invention may use a cylindrical lens which in the focused condition creates a longitudinal bar of light. Further alternative embodiments may be made with a spherical Fresnel lens or a cylindrical Fresnel lens which create larger areas of light, round and bar shaped, respectively, in the focused condition.

4 Claims, 6 Drawing Figures

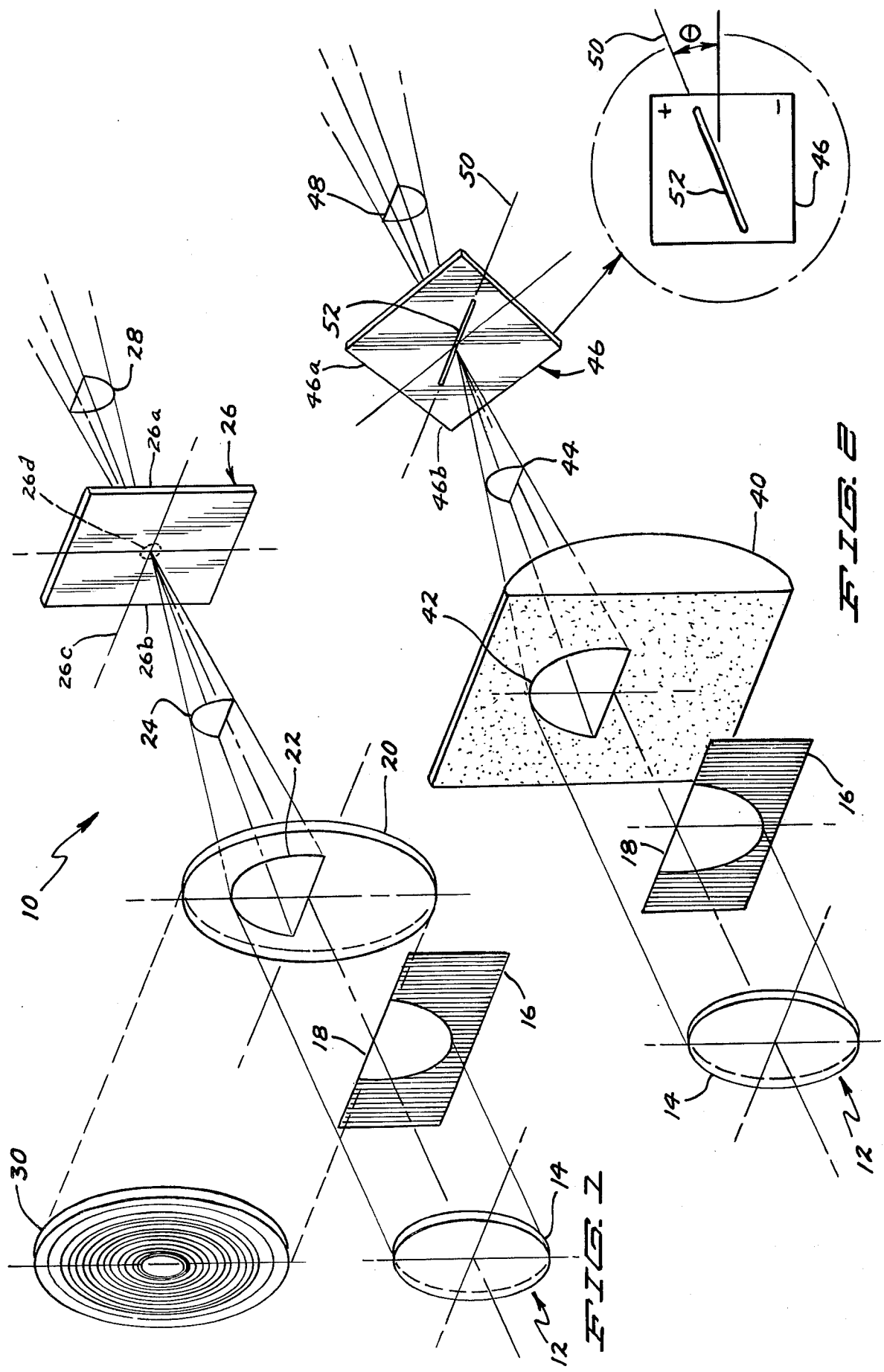

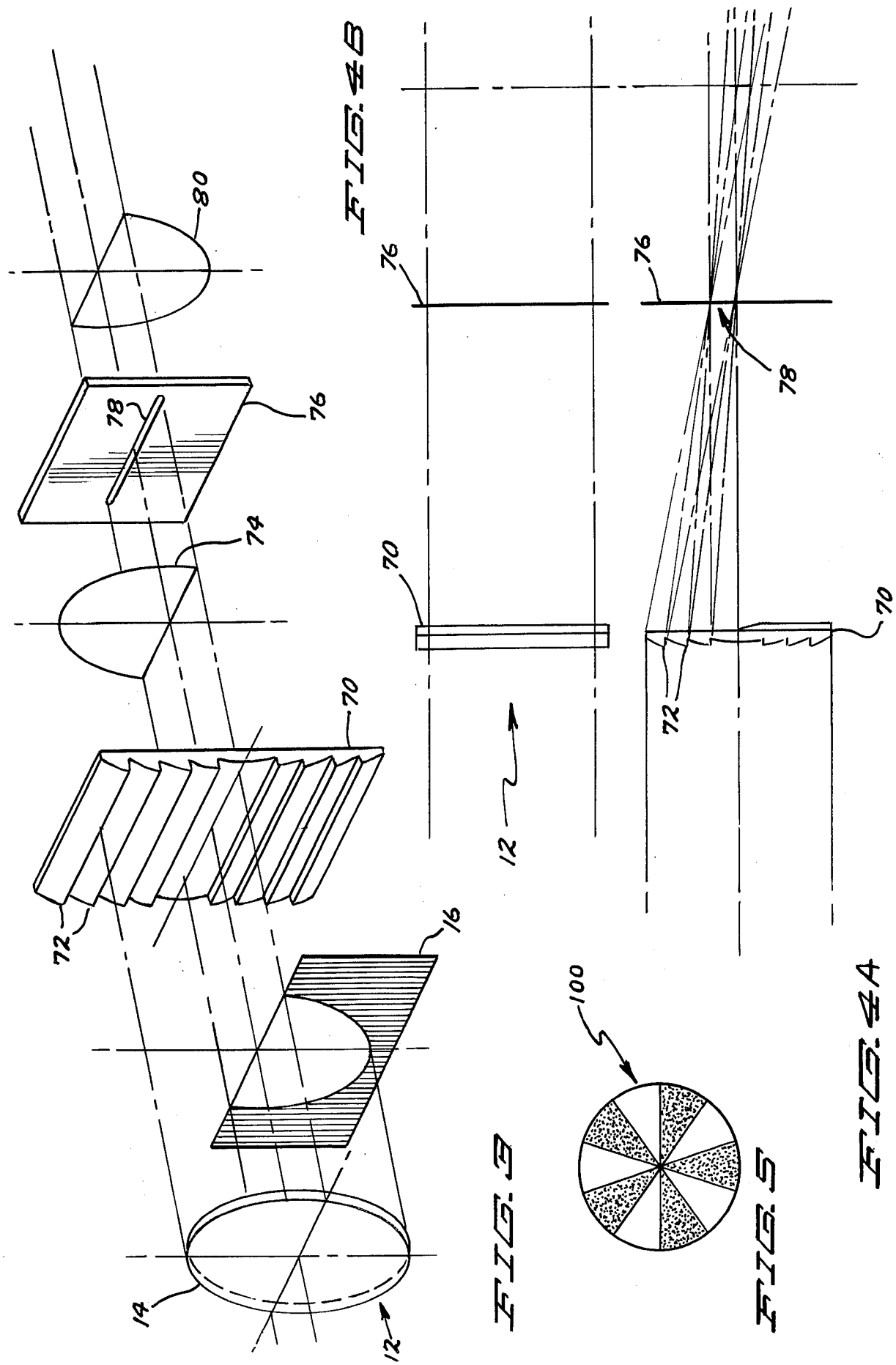

PARTIAL BEAM FOCUS SENSING IN AN OPTICAL RECORDING SYSTEM

BACKGROUND OF THE INVENTION

This invention relates to optical recording systems. In particular, this invention relates to the focusing detection systems to be used with optical media recording systems.

It is well known that optical recording systems require a very precisely focused condition of the light beam through an objective lens onto the recording media. The light beam focused on the media is, typically, reflected back through the objective lens and used in the system to read information on the media. The reflected light beam is typically divided into additional parts including a part, typically, used for focus detection information and to operate a focusing control system for a movable objective lens.

In optical recording technology, various focusing and light beam handling systems are known. In U.S. Pat. No. 3,974,327 a schematic diagram is shown of a light beam being returned directly from an objective lens to a light detector array from which a particular focusing system operates. A mirror which is partially reflecting and partially transparent may be used to control the splitting of the light beam into various elements for various purposes. U.S. Pat. No. 4,123,652 shows the use of partially reflecting and partially transparent mirrors or beam splitters to divide a light beam into various components in connection with both an information reading detector for one beam element and a focusing light detector array for another beam element. U.S. Pat. No. 4,123,652 shows what is known as the astigmatic focusing system whereby an image is distorted in a first direction in a first out of focus condition with respect to the recording media and in a second direction in a second out of focus condition with respect to the recording media. The two out of focus conditions with respect to the recording media are those involving the objective lens being too close to the media and too far from the media. It is noted that FIG. 7 of that patent shows a cylindrical lens element in connection with the focusing of a light beam on the light detector array. However, this patent is related to astigmatic focusing systems rather than partial beam focusing systems.

Also known to applicant are U.S. Pat. Nos. 3,969,576 and 4,143,402 relating to partial beam focusing systems.

In U.S. Pat. No. 3,969,576, separate light detecting elements are arranged to receive a portion of a light beam for use in reading information and another light detecting element is disposed at a different location to receive a light beam for purposes of operating a focusing system. The focusing beam is referred to in that patent as an auxiliary beam while the beam from which information is read is referred to as the read beam. A radiation absorbing knife is disposed between the radiation source and a Wollaston prism to block a portion of the auxiliary beam but which is so disposed with respect to the source and the prism that none of the read beam is blocked. As explained in the patent, the auxiliary beam is returned to the focusing light detector array as only a partial beam. In the focused condition, a comparatively small focused point of light exists on a pair of light detector elements. In one out of focus condition, a partial light beam, sometimes referred to as a half-moon, is focused on one-half or one element of the light detector array and in the other out of focus condition a partial light beam image or half-moon is shown on the other light detector element of the light detector array. This patent therefore represents the basic half-moon or partial light beam focusing system which is now comparatively well known.

U.S. Pat. No. 4,143,402 shows another half-moon focusing system to which the light from a source is only partially returned to a focusing detector system and in which the half-moon light spot returned to the focusing source occurs on one half or one portion of the light detector array for one out of focus condition and on the other portion of the light detector array for the other out of focus condition. In that patent, a prism is shown which reflects one-half of a portion of the light beam returned from the media to the focusing detector array while not affecting the other half of the light beam. The prism is disposed in such a fashion that it does not use all of the reflected light from the media for focusing on the detector array but allows a portion of the original beam to pass to an information reading detector array.

Both of the aforementioned partial beam focusing detection system patents show a means for forming a partial light beam which is also disposed in the path from the light source to the media and is not disposed so as to only affect light being reflected from the media. In systems adapted for reading from the media only, these systems are not as critical as to light lost in the partial beam system.

However, for systems in which data is to be both read and written, a partial beam system or system in which the light beam travelling towards the media may be reduced in strength have a critical disadvantage. In systems in which the media is to be written, it is important to conserve the power of the writing beam so that only a minimum power writing source may be provided. If the systems shown in the aforementioned partial beam patents were to be used in a reading and writing system, they would suffer at least one of several possible disadvantages such that there would be less power in the writing beam, larger spot size on the media than desired because of necessary additional optical elements interposed in the writing beam or comparatively complex or large sized lenses; all as compared to a system without such partial beam elements interposed in the writing beam.

Therefore, in systems in which focus is to be maintained during writing on the media, it is clear that it is necessary to provide a focus detection system which does not require the provision of any additional optical elements which may interfere with the writing beam. Also, the aforementioned patents result in an extremely critical physical relationship between the partial beam creating device, the knife in the one patent or the prism in the other patent, and the light detecting element. If there should be any misalignment between the focusing light detector array and the prism or the knife, then the focusing system will not work as intended. It is therefore desirable to provide a focusing system having a somewhat less critical relationship between the partial beam transmitting means and the focusing light detector array.

With respect to the astigmatic focusing system as shown in U.S. Pat. No. 4,123,652, it is noted that the astigmatic focusing system requires two cylinder lenses or one cylinder lens and one spherical lens or some other combination of multiple optical elements in order to create the astigmatic focusing pattern. Therefore, these additional optical elements create additional optical complexity or else cause loss of light between the media and the focusing detector array.

It is clear that it would be desirable to provide a focusing detection system having some of the advantages of both the astigmatic focusing system and of the knife edge focus detecting system.

SUMMARY OF THE INVENTION

An optical memory system is provided with a known optical system for separating the reflected beam returning from the media so that it passes into an optical partial beam focusing system according to the present invention. Typically, such an optical system would use a polarizing beam splitter and a quarter wave plate or a semi-transparent reflecting mirror to create a reflected beam portion which is separated from the line of travel of the transmitted beam portion. The system according to the present invention would have particular application to an optical recording system in which information is both written and read on the optical media.

Therefore, an input beam which represents a reflected light beam from the media and which is separated from the path of travel of the transmitted beam passes into an optical system according to the present invention in a collimated cross section, which may typically be circular. The collimated circular light beam passes to a spherical, in one embodiment of the invention, readout lens which focuses the light beam on the focusing light detector array. A mask such as a knife edge cuts the lower or upper portion of the collimated beam, leaving a partial beam in what may be referred to as a half-moon shape. This knife edge mask is disposed in close physical position to the spherical lens or it may even be attached to it. The knife edge may typically be placed in front of the spherical readout lens but may be behind it if it is physically close to the lens.

The half-moon light beam image takes one orientation on a focusing light detector array which matches the mask when the objective lens is focused in a near to focus but too close to the media position. The half-moon image appears in the other and opposite orientation when the near to focus condition places the objective lens in a relationship too far from the media. This is because the light pattern makes a center symmetric inversion in the plane of the detector array at the in focus condition.

The present invention has the advantage that it does not detract from the light beam energy impingent upon the media in a writing mode for a system which both reads and writes.

An alternative embodiment of the present invention involves the use of a spherical Fresnel lens instead of the spherical lens in connection with the knife edge to focus the light beam on the light detecting array. The spherical Fresnel lens causes the light spot on the light detector array to be comparatively larger than it would be with the spherical lens. In a perfect spherical lens, when the optical system would have the objective lens in a perfectly focused condition on the optical media, the light impinging on the focusing light detector array would tend to converge to a vanishingly small spot. The detector array then would most advantageously detect the out of focus half-moon image conditions but would have a minimumly small light detecting signal output in the focused condition. This minimally small light detecting signal output would be subject to noise disturbance. However, the use of the Fresnel spherical lens would leave a larger light spot in the focused condition which would be symmetrical on both sides of the light detector axis so that the light detecting elements in the light detector array would produce a balanced output representative of some light strength. This balanced output signal would be comparatively free of noise disturbance.

Another embodiment of the present invention would use a cylindrical lens together with the knife edge to produce a half-moon image which in the focused condition would tend to go to a thin bar shape or a line shape rather than to a point shape as is the case with the spherical lens. Again, this would have the advantage of being detected by the light detector array better than a vanishingly small spot. Yet another embodiment of the present invention would use a cylindrical Fresnel lens which would, in the focused condition, tend to go to a longitudinal wide bar shape on the focusing detector array which would be symmetrical about the axis of the light detector array.

IN THE FIGURES

FIG. 1 shows a first embodiment of the present invention using a spherical lens and a knife edge.

FIG. 2 is an illustration of another embodiment on the present invention using a knife edge and a cylindrical lens.

FIG. 3 is a showing of another embodiment of the present invention using a cylindrical Fresnel lens.

FIG. 4a is a side plan view of the embodiment of the invention shown in FIG. 3 to illustrate the generation of a bar pattern by the cylindrical Fresnel lens.

FIG. 4b is a top view of the embodiment of the invention shown in FIG. 3.

FIG. 5 shows a central symmetric mask element.

DESCRIPTION OF THE PREFERRED EMBODIMENT

Referring now to FIG. 1, an embodiment 10 of the present invention is shown using a collimated circular light beam 12 passing into the system as shown schematically at 14. A mask such as knife edge element 16 partially obstructs a portion of the beam creating a half-moon image 18 on the knife edge element. The knife edge element may be placed on a spherical lens element 20 or in front of it or behind it, but, it is most desirable that it be placed in a proximate position with respect to the spherical lens element 20. Other mask patterns than the simple knife edge are possible within the scope of the present invention so long as the mask pattern is center symmetric. The knife edge pattern shown in FIG. 1 is center symmetric.

The half-moon image passing through the spherical lens element 20 is shown diagrammatically at 22. A half-moon image at 24 and an upside down half-moon image at 28 illustrate the pre and post focused images formed by the partial or half-beam passing through the spherical lens element 20 to illustrate the shape of the image generated on the partial beam, light detector array 26. The detector array has detector elements in a pattern to match the mask. In a focused condition, as shown, the detector array 26 receives an image converging nearly to a point. The detector array 26 is divided into a top half 26a and a bottom half 26b by a line 26c which represents the fact that the detector array consists of light detecting elements at 26a and 26b, respectively.

An alternative embodiment of the present invention would replace the spherical lens element 20 with a spherical Fresnel lens element 30. In the near to focus, pre and post focus conditions, half-moon images resembling the symbolic images at 24 and 28 would exist on the focusing light detector array 26. However, at a focused condition, a round image would be formed, shown by a dotted line, at 26d. This would allow a greater amount of light to fall on the two detector elements 26a and 26b to produce a stronger and balanced indication of light output on the detector array which would allow the focusing detector system to work in a balanced but comparatively noise free condition when the recording media is in a focused condition with respect to the objective lens.

Referring now to FIG. 2, another embodiment of the invention is shown in which a light beam 12 enters the system in a collimated condition, shown symbolically at 14. The beam impinges on a knife edge 16 where a partial beam is formed with the portion of the image blocked by the knife edge shown illustratively at 18. This embodiment is different from the previous embodiment in that a cylindrical lens 40 forms the optical element of the system. A half-moon image is shown symbolically at 42 to illustrate the partial light beam traversing through the cylindrical lens element 40. An image at 44 and an image at 48 illustrate the pre and post focus image conditions in the near out of focus condition using a cylindrical lens. The beam still has a half-moon shape, although it is in a slightly flattened condition because of use of the cylindrical lens 40 as compared to the true half-moon shape of the images shown at 24 and 28 as a result of using the spherical lens 20, as shown in FIG. 1.

A split detector array at 46 having a pair of light detecting elements 46a and 46b receives the light beam in the system. In the focused condition, the cylindrical lens forms a bar shaped light element at 52. Because the bar shaped light element or image 52 in the focused condition would tend to fall between the two light detecting elements at 46a and 46b, the light detecting array 46 is disposed at an angle, shown schematically at 50, with respect to the vertical axis of the cylindrical lens 40 which generates the bar shaped light element or image 52. The result of this is that the bar shaped light image then tends to fall symetrically on both light detecting elements 46a and 46b. Thus, the output signals from light detecting elements 46a and 46b would be in a balanced condition representative of an approximately equal amount of light falling on both light detector elements. However, the result is also that in the out of focus condition, the half-moon image falling on the light detector array 46 also tends to have some of the half-moon image fall on the undesired light detector element. However, the majority of the light beam still impinges on the desired light detector element so that the out of focus condition can be easily detected by the strong imbalance in the output of the light detector elements indicating an imbalance condition of the light beam falling on the elements.

Referring now to FIG. 3, another embodiment of the invention is shown using a cylindrical Fresnel lens element 70. The cylindrical Fresnel lens element is characterized by having individual Fresnel lens elements 72 longitudinally displaced in the same axis as the axis of the cylindrical Fresnel lens. The result of using a cylindrical Fresnel lens element 70 is similarly the creation of half-moon shaped partial beam images at 74 and 80 showing, respectively, a pre and post focus condition of the objective lens element with respect to the optical media. However, the in focus light beam produces a wider light bar element or image 78 as a result of using the cylindrical Fresnel lens 70 than the light bar element or image 52, shown in FIG. 2 with the conventional cylindrical lens element. FIG. 4a illustrates the system of the embodiment shown in FIG. 3 with the cylindrical Fresnel lens element 70 having individual elements 72. The light beam coming from an individual Fresnel lens 72 arrives on the light detector array 76 in a focused condition to produce a comparatively wide bar light image shown at 78.

It is noted that the half-moon or partial beam focusing system of the present invention only needs a split or dual light detector and not a quadrature light detector which represents an advantage in detector simplicity. It is also noted that the half-moon or partial beam focusing system needs only a single focusing lens in connection with the detector array and the knife edge element. Thus, the knife edge element or opaque material which creates the partial beam is clearly a more simple optical element than the provision of the present additional lenses needed with astigmatic focusing. Thus, the present half-moon focusing system may work with only a single lens and a knife edge rather than with the two lenses needed for astigmatic focusing.

The present invention operates according to certain general principles of optical physics and, accordingly, there are many alternative embodiments within the scope of the present invention. In the illustrative embodiment of the invention using half-moon focus sensing, the incoming light beam is simply divided into top and bottom halves. Focus sensing according to the present invention works because the focus sensing beam performs a center symmetric inversion in the plane of the detector array when the system is in focus. The center symmetric inversion of the focus sensing light beam is always present but, if the system is out of focus the detector array is on one side or the other of the center symmetric inversion. In general, the most basic embodiment of the invention is to place a mask with a pattern having central symmetry in an incoming collimated focus sensing light beam. Then a detector array that matches the mask pattern is placed in the expected focal plane for the in-focus condition. The detector array elements are then used to produce a differential signal when the light pattern reverses itself.

Examples of appropriate central symmetry mask patterns would be those using centrally radiating spokes including those with symmetric patterns of curved spokes. Various patterns including symmetry about concentric circles can be superimposed on appropriate spoke patterns. The spoke patterns can create segments which may be two in number, as in half-moon focusing, or 6, 10, 14 etc. The segments need not be the same size, just centrally symmetric. Of course numerous other centrally symmetric patterns can be used for a mask.

The various mask patterns have different advantages and disadvantages. The half-moon mask pattern is probably the simplest to implement and allows the detector array electronics to be simple. However, a disadvantage can be that alignment of the detector array is sensitive in the direction perpendicular to line or terminator separating the halves of the "moon". This sensitivity is because of the small light spot size at focus and is one of the reasons for employing the Fresnel lens embodiment. Thus, a more complex segmented mask pattern could also be desirable because it would be less sensitive to linear motion than the half-moon embodiment and would have a larger in-focus light spot because of internal beam diffraction from the mask.

For example, FIG. 5 shows a centrally symmetric mask pattern 100 which would be suitable according to the present invention when used with a matching light detector pattern. This mask has ten segments or pie-shaped slices every other one of which blocks or masks light.

What is claimed is:

1. A partial beam focus sensing system in optical recording comprising:

a Fresnel lens element for receiving a collimated light beam in an optical recording system representative of light reflected from optical recording media and not for receiving any light transmitted to said media, a centrally symmetric mask element proximate to said lens element for eliminating a portion of said light beam and transmitting a partial light beam, and a light detector array comprising at least two light detecting elements matched to said mask element and disposed to receive said partial beam from said lens element.

2. The system of claim 1 in which said lens element is a spherical Fresnel lens.

3. The system of claim 1 in which said lens element is a cylindrical Fresnel lens and said light detector array is disposed at an angle with respect to the vertical axis of said cylindrical Fresnel lens.

4. The system of any one of claims 1, 2, or 3 in which said mask element has a plurality of spokes radiating from the center to divide the light beam into a number of segments, every other one of which blocks light.

* * * * *